United States Patent
Kantani et al.

(10) Patent No.: US 10,703,657 B2
(45) Date of Patent: Jul. 7, 2020

(54) WASTE WATER TREATMENT METHOD USING MEMBRANE SEPARATION-ACTIVATED SLUDGE

(71) Applicant: TORAY INDUSTRIES, INC., Tokyo (JP)

(72) Inventors: Seiko Kantani, Shiga (JP); Yohito Ito, Shiga (JP); Hideaki Ando, Shiga (JP)

(73) Assignee: TORAY INDUSTRIES, INC., Tokyo (JP)

(*) Notice: Subject to any disclaimer, the term of this patent is extended or adjusted under 35 U.S.C. 154(b) by 124 days.

(21) Appl. No.: 16/097,086

(22) PCT Filed: Mar. 30, 2017

(86) PCT No.: PCT/JP2017/013292
§ 371 (c)(1),
(2) Date: Oct. 26, 2018

(87) PCT Pub. No.: WO2017/187878
PCT Pub. Date: Nov. 2, 2017

(65) Prior Publication Data
US 2019/0345049 A1    Nov. 14, 2019

(30) Foreign Application Priority Data

Apr. 28, 2016 (JP) ................. 2016-090450

(51) Int. Cl.
*C02F 3/12* (2006.01)
*C02F 3/20* (2006.01)
(Continued)

(52) U.S. Cl.
CPC .......... *C02F 3/1273* (2013.01); *B01D 63/082* (2013.01); *B01D 65/02* (2013.01);
(Continued)

(58) Field of Classification Search
CPC .......... B01D 2315/06; B01D 2321/185; B01D 63/082; B01D 65/02; B01D 65/08;
(Continued)

(56) References Cited

U.S. PATENT DOCUMENTS

2012/0111784 A1    5/2012    Morita et al.
2014/0151299 A1    6/2014    Downey et al.

FOREIGN PATENT DOCUMENTS

JP    8-99025 A    4/1996
JP    8-266875 A    10/1996
(Continued)

OTHER PUBLICATIONS

International Search Report (Form PCT/ISA/210) for International Application No. PCT/JP2017/013292, dated May 16, 2017, with English translation.
(Continued)

*Primary Examiner* — Dirk R Bass
(74) *Attorney, Agent, or Firm* — Birch, Stewart, Kolasch & Birch, LLP

(57) ABSTRACT

In a waste water treatment method using membrane separation-activated sludge, when, during filtration while supplying air using an immersion-type membrane separation unit loaded with multiple flexible membranes, the filtration differential pressure of the membranes at a set filtration flow rate exceeds a specified value P2 with respect to the filtration differential pressure P1 of the initial period of operation, membrane filtration is continued with air supply stopped until the filtration differential pressure P3 becomes P3≥P1+20 [kPa]. Then with the filtration flux or filtration pressure being smaller or negative compared to when filtering while supplying air, air is supplied and after the filtration differential pressure P4 during filtration reaches P4≤P1+5 [kPa], filtration is returned to filtration while supplying air.

10 Claims, 4 Drawing Sheets

(51) Int. Cl.
*B01D 63/08* (2006.01)
*B01D 65/02* (2006.01)
*C02F 11/147* (2019.01)

(52) U.S. Cl.
CPC ............ *C02F 3/208* (2013.01); *C02F 11/147* (2019.01); *B01D 2321/185* (2013.01); *C02F 2303/16* (2013.01)

(58) Field of Classification Search
CPC ...... C02F 11/147; C02F 1/52; C02F 2209/03; C02F 2209/38; C02F 2303/16; C02F 3/006; C02F 3/101; C02F 3/1273; C02F 3/20; C02F 3/208; Y02W 10/15
See application file for complete search history.

(56) References Cited

FOREIGN PATENT DOCUMENTS

| | | |
|---|---|---|
| JP | 9-290141 A | 11/1997 |
| JP | 2000-325998 A | 11/2000 |
| WO | WO 2010/113822 A1 | 10/2010 |
| WO | WO 2011/004743 A1 | 1/2011 |

OTHER PUBLICATIONS

Japanese Office Action for Japanese Application No. 2017-533037, dated Aug. 1, 2017, with English translation.
Written Opinion of the International Searching Authority (Form PCT/ISA/237) for International Application No. PCT/JP2017/013292, dated May 16, 2017, with English translation.

WASTE WATER TREATMENT METHOD USING MEMBRANE SEPARATION-ACTIVATED SLUDGE

TECHNICAL FIELD

The present invention relates to a wastewater treatment method at the occasion of treatment of sewage, industrial wastewater and so on by a membrane bioreactor.

BACKGROUND ART

A membrane bioreactor used at the occasion of treatment of sewage and industrial wastewater is a treatment method in which biological treatment is performed in a biological reaction tank and activated sludge is subjected to a solid-liquid separation by the use of filtration membranes submerged in the reaction tank to obtain clear treated water.

In the membrane bioreactor, a membrane surface is always cleaned by air supply from beneath a separation membrane unit. However, when operation is continued for a long period of time, sludge-derived matter which cannot be removed by only the air supply sometimes remains on the membrane surface. When this matter once starts to adhere thereto, the effective surface area of the membrane is lowered, sludge deposition grows based thereon, and the thickness or the area is gradually increased to soon form a sludge layer called a cake layer. In this state, the sludge layer cannot be removed by only the usual air supply, and therefore, first, a method of performing chemical liquid cleaning with sodium hypochlorite is considered.

As the chemical liquid cleaning method of membranes, there are an out-of-tank cleaning method in which a submerged type membrane separation unit in its entirety or a membrane element is taken out from a tank and cleaned, and an in-tank cleaning method in which a chemical liquid is injected into a membrane permeate channel while submerging the separation membrane unit in a tank. However, particularly in a flat sheet membrane unit, the latter in-tank cleaning method is mainly used, because of problems of workability and space. Patent Document 1 proposes a method in which a chemical liquid for decomposing matter adhered to membranes is injected into a permeate channel of a membrane separation device and into a membrane element, and a state that the chemical liquid in the permeate channel is in contact with the filtration membranes is maintained for about 1 hour.

Furthermore, the adhered matter which causes clogging of the membranes in the membrane bioreactor includes not only organic matter not decomposed by the activated sludge, but also inorganic matter contained at a high concentration in water to be treated, and so on. In such a case, there is a method in which chemical liquids different in effect are used in combination in response to the adhered matter. For example, Patent Document 2 and Patent Document 3 propose in-tank cleaning methods in which sodium hypochlorite for decomposing the organic matter and hydrochloric acid, citric acid, oxalic acid or the like for removing the inorganic matter are used and sequentially injected in two steps.

All of these methods have effects of effectively removing the matter which causes clogging of the membranes, such as the organic matter and the inorganic matter, and recovering the permeation flux of the membranes.

However, after the sludge is once adhered to the membrane surfaces firmly or in large amounts, the membranes are sometimes only partially recovered even when the chemical liquid cleaning is performed. When the chemical liquid concentration is increased or the chemical liquid submersion time is prolonged, in order to enhance the cleaning effect, a part of the chemical liquid injected flows out into the tank, which causes a problem of exerting adverse influences such as lowering of physiological activity of microorganisms in the activated sludge and deterioration of filterability by decomposition of the sludge. On the other hand, under mild chemical cleaning conditions, it is necessary to repeat cleaning many times, and finally, there is nothing but to take the submerged type membrane separation unit out from the tank and to clean flat sheet membrane elements one by one. This causes a problem of large-scaled and complicated work.

BACKGROUND ART DOCUMENT

Patent Document

Patent Document 1: JP-A-8-99025
Patent Document 2: JP-A-8-266875
Patent Document 3: JP-A-9-290141

SUMMARY OF THE INVENTION

Problems that the Invention is to Solve

In a method for solving the foregoing problems and subjecting wastewater to membrane bioreactor treatment, an object of the present invention is to provide a wastewater treatment method in which not only the amount used of a chemical liquid exerting adverse influences on microorganisms in activated sludge is reduced, but also adhered matter on membrane surfaces is effectively sufficiently removed to recover a membrane filtration pressure difference, whereby it is possible to realize stable membrane filtration operation for a long period of time.

Means for Solving the Problems

In order to solve the above-described problem, the present invention has the following configurations.
(1) A wastewater treatment method by a membrane bioreactor, including, during operation for performing filtration while performing air supply using a submerged type membrane separation unit in which a plurality of membrane elements having flexibility are loaded, when a filtration pressure difference of the membrane elements exceeds a predetermined value $P2$, to a filtration pressure difference $P1$ at an initial stage of the operation, performing filtration until a filtration pressure difference $P3$ satisfies $P3 \geq P1+20$ [kPa] in a state that an air supply amount is smaller than that during the operation for performing the filtration while performing the air supply, then performing the air supply in a state that a filtration flux or a filtration pressure is smaller than that during the operation for performing the filtration while performing the air supply or negative, and being returned to the operation for performing the filtration while performing the air supply after a filtration pressure difference $P4$ during performing the filtration reaches $P4 \leq P1+5$ [kPa].
(2) The wastewater treatment method according to (1), in which, when the filtration pressure difference of the membrane elements exceeds the predetermined value $P2$, to the filtration pressure difference $P1$ at the initial stage of the operation, the filtration is performed until the filtration pressure difference P3 satisfies P3≥P1+20 [kPa] in a state that the air supply is stopped.

(3) The wastewater treatment method according to (1) or (2), in which the filtration is performed until the filtration pressure difference P3 satisfies P3≥P1+20 [kPa], and thereafter, the air supply is performed in a state that the filtration is stopped.

(4) The wastewater treatment method according to any one of (1) to (3), in which the filtration is performed until the filtration pressure difference P3 satisfies P3≥P1+20 [kPa], and thereafter, the air supply amount is more increased than the last supply amount.

(5) The wastewater treatment method according to any one of (1) to (4), in which the filtration is performed until the filtration pressure difference P3 satisfies P1+30≤P3≤P1+50 [kPa].

(6) The wastewater treatment method according to any one of (1) to (5), in which, during the operation for performing the filtration while performing the air supply, when the filtration pressure difference of the membrane elements exceeds the predetermined value P2, to the filtration pressure difference P1 at the initial stage of the operation, a time period for performing the filtration until the filtration pressure difference P3 satisfies P3≥P1+20 [kPa] in the state that the air supply amount is smaller than that during the operation for performing the filtration while performing the air supply is from 30 minutes to 48 hours.

(7) The wastewater treatment method according to any one of (1) to (6), in which the membrane bioreactor includes a coagulant addition process.

(8) The wastewater treatment method according to any one of (1) to (7), in which, as the submerged type membrane separation unit, a submerged type membrane separation unit having an opening part on a side thereof which is parallel to a direction in which the plurality of membrane elements are loaded is used.

(9) The wastewater treatment method according to any one of (1) to (8), in which the membrane elements loaded in the submerged type membrane separation unit are flat sheet membrane elements.

(10) The wastewater treatment method according to (9), in which the flat sheet membrane elements each include: a flat sheet membrane pair having two flat sheet membranes arranged so that surfaces on permeation sides thereof are opposite to each other and a water collection flow channel provided between the flat sheet membranes; a sealing part for sealing between the flat sheet membranes in a peripheral part thereof; and an adhesive interlining cloth having a resin part for bonding both surfaces on the permeation sides of the flat sheet membrane pair which are opposite to each other, whereby a predetermined spacing is ensured between the flat sheet membranes.

Advantage of the Invention

Using the present invention, when a filtration pressure difference is increased during filtration operation with air supply, filtration is performed by decreasing an air supply amount to once form sludge layers on membrane surfaces, and thereafter, the air supply is performed in a state that a filtration flux or a filtration pressure is smaller than that during the operation for performing the filtration while performing the air supply or negative to peel off the sludge layers from the membrane surfaces integrally with adhered matter accumulated in membrane pores, whereby it becomes possible to remove the membrane surface-adhered matter simply and efficiently, which makes long-term stable operation possible. In addition, large-scaled cleaning of taking a submerged type membrane separation unit out from a tank also becomes unnecessary, moreover, adverse influences due to a chemical liquid are not exerted on microorganisms in activated sludge, because no chemical liquid is used, and further, it also becomes possible to reduce a risk of exerting adverse influences on the environment.

MODE FOR CARRYING OUT THE INVENTION

Figure 1:
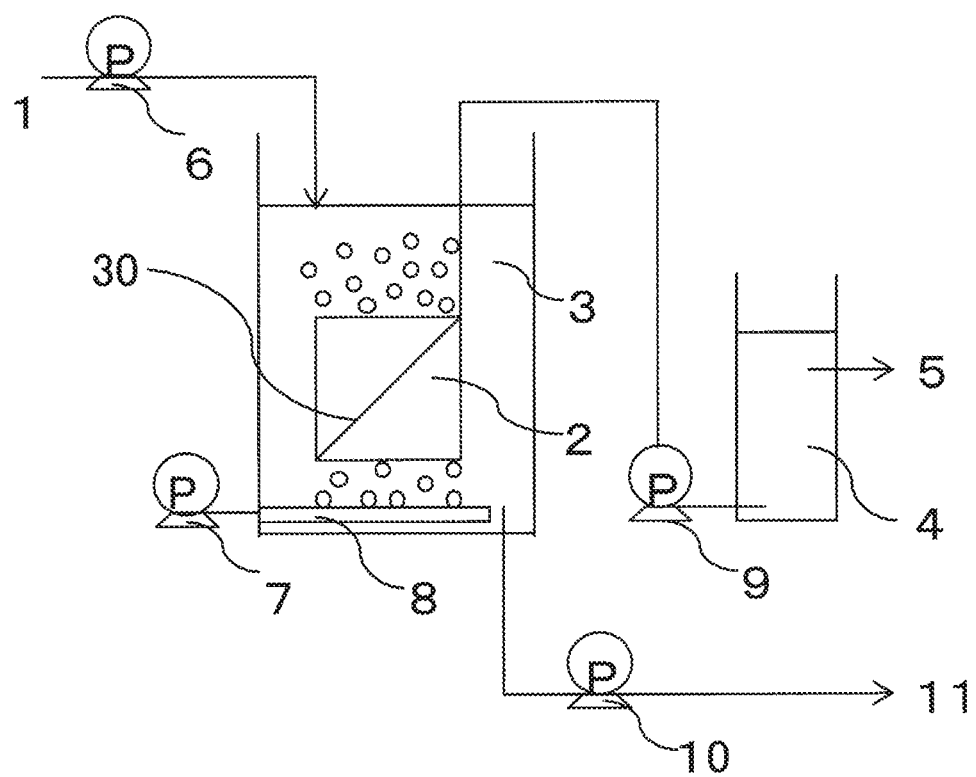
FIG. 1 shows an example of a flow of wastewater treatment by a membrane bioreactor using a submerged type membrane separation unit.

FIG. 1 is a schematic view showing a flow of typical membrane bioreactor treatment used in the present invention.

First, wastewater 1 is supplied to an activated sludge treatment tank 3 by a raw-water feed pump 6, and organic matter, nitrogen and so on in the wastewater are removed and treated by adsorption due to activated sludge and decomposing action due to microorganisms. Then, the activated sludge is filtrated by a submerged type membrane separation unit 2. Treated water 5 filtrated is stored in a filtrate tank 4, and thereafter reused or discharged. In a membrane bioreactor, operation is performed at an activated sludge concentration in the treatment tank of generally about 2,000 to 20,000 mg/L, but it is not particularly limited.

In order to filtrate the activated sludge through the submerged type membrane separation unit 2, a pump or the like may be provided between the submerged type membrane separation unit 2 and the filtrate tank 4, and in order to apply a water head pressure difference, a filtrate liquid level in the filtrate tank 4 may be made lower than a liquid level of the organic wastewater 1 in the activated sludge treatment tank 3. In FIG. 1, filtration is performed by a suction pump 9. In addition, the activated sludge filtrated is discharged to the outside as drawn-out sludge (excess sludge) 11 by a sludge drawing pump 10.

During filtration operation (operation for performing filtration while performing air supply), in order to supply oxygen to the activated sludge and remove sludge adhered to flat sheet membranes in the submerged type membrane separation unit, an air diffuser 8 is installed beneath the submerged type membrane separation unit 2, and the air is always continuously supplied by an air supply device 7. Air bubbles which come out of the air diffuser 8 pass through between a flat sheet membrane element 30 and a flat sheet membrane element 30 adjacent thereto together with an upward flow of the sludge, and at that time, the sludge adhered to membrane surfaces is peeled off from the membrane surfaces.

Herein, in this embodiment, the membrane element 30 constructing the submerged type membrane separation unit 2 may have any shape, as long as it has flexibility. Among others, the flat sheet membrane element in which a flat sheet membrane is attached to each of the front and back sides of a resinous support is preferred. However, the support for supporting the membrane shape may be present or not. A hollow fiber membrane may be used in place of the flat sheet membrane. The term "has flexibility" means being easily reversibly bendable and having bendability and softness.

In the case of the flat sheet membrane element having flexibility, when the air is supplied from below in an activated sludge liquid, the flat sheet membrane element is deformed and bent like a flag due to the upward flow of the air or the sludge to become a structure liable to flutter, because of its flat plate shape. The flat sheet membrane element itself is deformed and bent, and flutters, whereby a slight clearance is generated between a sludge layer adhered to the membrane surface and the membrane surface, and the air bubbles or sludge enters therein due to the air supply to provide an effect of easily peeling the sludge layer. Further, because of the flat sheet shape, the sludge adhered to the membrane surface forms an integrated thin membrane state. Therefore, an effect is obtained that, when peeled at one part, the remaining sludge layer is peeled off together with the upward flow of the sludge, triggered by the peeled part. Thereby, an effect of recovering the filtration pressure difference by only the air supply without using a chemical liquid is obtained.

Herein, as the flat sheet membrane element having flexibility, for example, a flat plate-shaped element in which a filter plate of a flexible material such as a nonwoven fabric, a net or the like is used as the membrane support and the flat sheet membrane is attached to each of both the front and back sides thereof, as exemplified in WO 2009/118785, a flat plate-shaped element in which a resin having low rigidity is used as the support and the flat sheet membrane is attached to each of both the front and back sides thereof, or a flat sheet membrane element in which a spacer cloth having a pile spread mechanism knitted so as to form loops with a material containing a plastic such as polyester or an inorganic material such as glass fiber or metal is used as a support nonwoven layer and a fine pore membrane layer is bonded to each of the upper and lower sides thereof by wet coagulation or lamination, as exemplified in Japanese Patent No. 5615802, preferably has an effect of promoting peeling of the sludge layer on the membrane surface, because the element itself is easily deformed and bent, and liable to flutter.

In addition, the flat sheet membrane element may have a configuration in which a spacer formed of a material having air permeability, such as a nonwoven fabric, a base material having a wavy cross section and a porous plate or a porous material are provided in combination between the filtration membranes, as exemplified in Japanese Patent No. 3815645, or a configuration in which a loop shape is formed by one or a plurality of membrane sheets, a filter plate is placed between the filtration membranes and only end parts thereof are fixed to form a bag shape, as exemplified in WO 2009/118787. Of the flat plate-shaped elements in each of which a resin is used as the filter support and the flat sheet membrane is attached to each of both the front and back sides thereof, as exemplified in WO 2009/118785, one in which a resin having low rigidity is used as the support may be used. Additionally, as to a detailed structure of a device, one described in WO 2014/010554 is appropriately exemplified.

Figure 2:
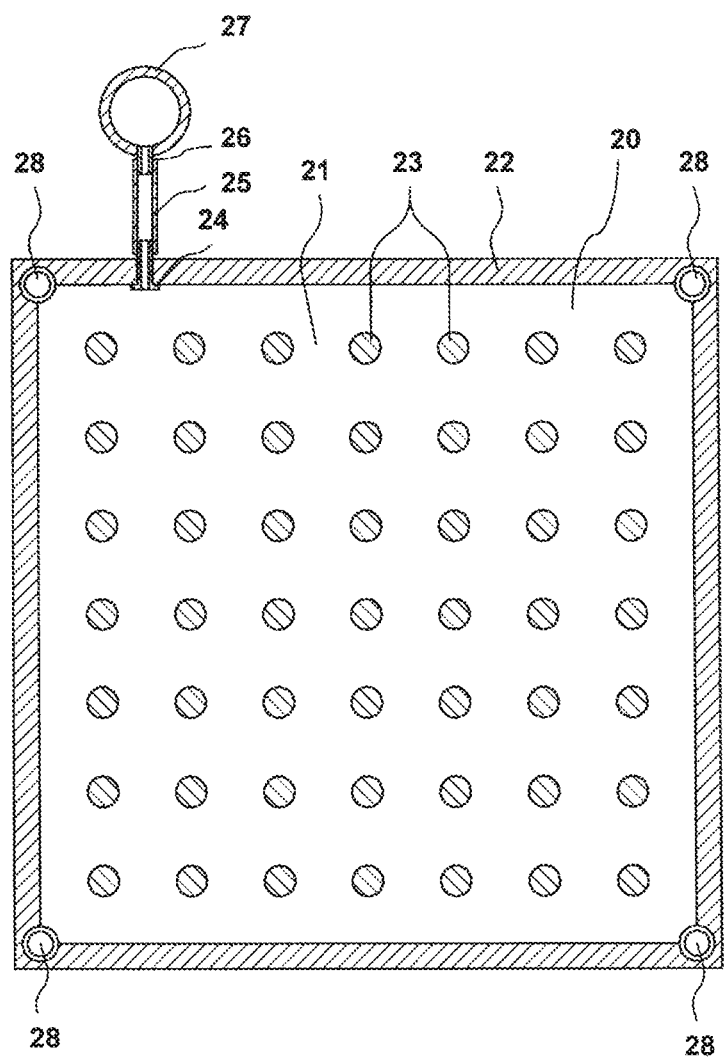
FIG. 2 shows an example (cross-sectional view) of a flat sheet membrane element having flexibility according to the present invention.

An example of a flat sheet membrane element according to this embodiment is shown in FIG. 2. A structure containing a pair of flat sheet membranes 20 having two flat sheet membranes 20 arranged so that surfaces on permeation sides thereof are opposite to each other and a water collection flow channel 21 provided between the flat sheet membranes 20, and a sealing part 22 for sealing between the flat sheet membranes 20 in a peripheral part thereof can be exemplified as a appropriate one. In particular, appropriate examples thereof include a structure in which a predetermined spacing is ensured between the flat sheet membranes 20 with an adhesive interlining cloth having resin parts 23 bonding to both the surfaces on the permeation sides of the pair of flat sheet membranes 20, which are opposite to each other.

In order to suppress flow resistance of a permeate between the flat sheet membranes and maintain a water amount, the spacing between the two filtration membranes is preferably provided within a range of 50 μm to 5000 μm.

In the present invention, the flat sheet membrane 20 preferably comprises a base material and a separation functional layer, and a layer in which a resin configuring the separation functional layer and the base material are present together preferably intervenes between the base material and the separation functional layer. Further, the resin enters from a surface of the base material into the inside thereof, whereby the separation functional layer is firmly fixed to the base material to produce an effect of preventing the separation functional layer from being peeled from the base material during the fluttering due to the air supply. This is therefore more appropriate. The separation functional layer may be unevenly present on one surface of the base material, or the separation functional layers may be present on both surfaces thereof. The separation functional layer may have either a symmetrical structure or an unsymmetrical structure, with respect to the base material.

In addition, when the separation functional layers are present on the both surfaces of the base material, the separation functional layers on the both sides may be either continuous through the base material or discontinuous.

In the flat sheet membrane 20 formed of the separation functional layer and the base material, the base material has a function of supporting the separation functional layer to provide strength to the flat sheet membrane 20. Materials forming the base material include but are not particularly limited to organic base materials, inorganic base materials and so on. However, the organic base materials are preferred in terms of easy weight reduction. The organic base materials include woven and knitted fabrics and nonwoven fabrics which comprises organic fibers such as cellulose fibers, cellulose triacetate fibers, polyester fibers, polypropylene fibers and polyethylene fibers. Of these, the nonwoven fabrics whose density is relatively easily controlled are particularly preferred.

In order to maintain durability and filtration performance of the membrane, the thickness of the flat sheet membrane is preferably selected within a range of 0.001 mm to 0.5 mm (1 μm to 500 μm), and more preferably within a range of 0.05 mm to 0.2 mm (50 μm to 200 μm).

In terms of pore size control and durability, a cross-linked polymer is preferably used for the separation functional layer, and in terms of separation performance of components, a membrane can be preferably used in which a separation functional layer obtained by polycondensation of a polyfunctional amine and a polyfunctional acid halide compound, an organic or inorganic hybrid function layer or the like is laminated on a porous support layer. In addition, a membrane which is the porous support layer and has both of a separation function and a support function, such as a porous support layer of a cellulose membrane, a polyvinylidene fluoride membrane, a polyethersulfone membrane, a polysulfone membrane or the like, can also be used. It may be a membrane in which the separation functional layer and the porous support layer are realized in a single layer.

As the flat sheet membrane 20, any one of a reverse osmosis membrane, a nanofiltration membrane, an ultrafiltration membrane and a microfiltration membrane may be applied. In addition, according to the size of matter to be separated, one or more appropriate types of membranes may be selected and combined. However, the ultrafiltration membrane and the microfiltration membrane are particularly preferred for sewage/wastewater treatment.

Of these, the membrane of a structure having many pores and excellent surface smoothness is appropriately used. This is because when sludge on the membrane surface is compacted by stopping the air supply and performing suction filtration, and thereafter, suction filtration is stopped, followed by performing the air supply, the compacted sludge layer becomes easily removable from the membrane surface all at once.

In each flat sheet membrane element 30, water having passed through the flat sheet membrane 20 is collected in a water collection pipe 27 arranged with a connection port 26, passing through a water collection flow channel 21, a water collection port 24 and a water collection nozzle 25, and taken out of the system of each flat sheet membrane element 30. In order to take out the permeate from the plurality of flat sheet membrane elements 30 easily and surely, a hollow connection port 26 is preferably arranged to the water collection pipe 27.

In addition, a method for fixing the flat sheet membrane element 30 having flexibility appropriate for carrying out the present invention to a prop is not particularly limited, as long as the flat sheet membrane element 30 has a structure liable to flutter by influences of flows of water to be treated and the air bubbles. However, it is appropriately exemplified to provide a through hole 28 for fixing to the prop, near an end part (corner part) of the element, as shown in FIG. 2. The number of the through holes is not particularly limited, and an appropriate number of through holes may be provided depending on the size of the element and fixing strength according to the necessity. When the flat sheet membrane 20 has a nearly rectangular shape, the through holes are provided preferably in one or more places, and more preferably in two or more places, in a surface direction of the flat sheet membrane 20. When the through hole is formed, for example, by forming an eyelet, a periphery of the through hole is reinforced. This is therefore preferred in terms of durability.

Figure 3:
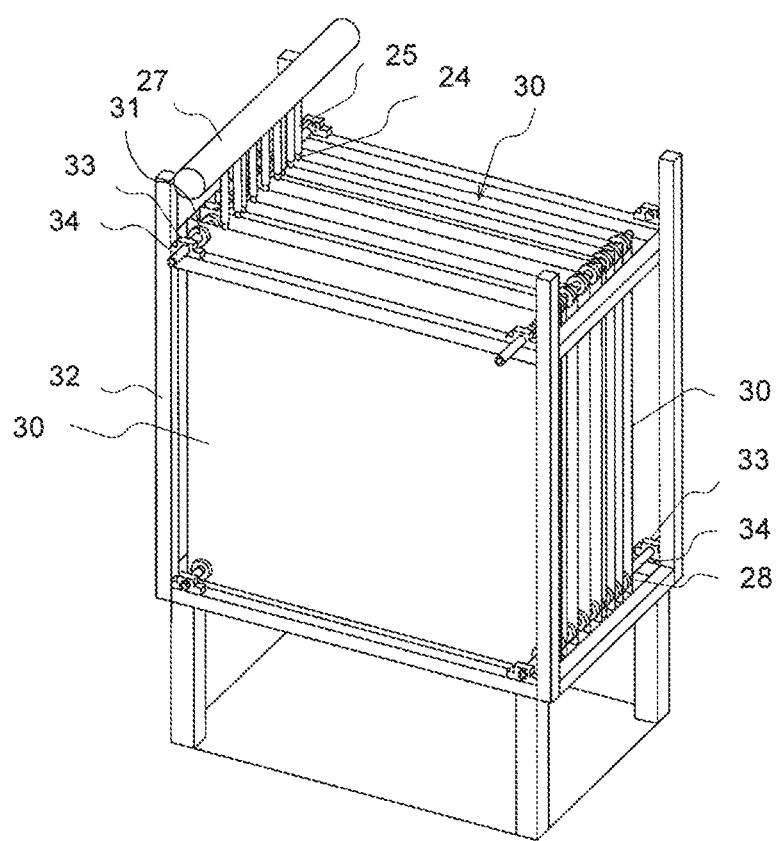
FIG. 3 is a perspective view showing an example of a submerged type membrane separation unit according to the present invention.

FIG. 3 shows an example of a submerged type membrane separation unit in which the plurality of flat sheet membrane elements 30 appropriate at the occasion of carrying out the present invention are loaded while securing spacings.

The structure of the submerged type membrane separation unit appropriately has, but is not particularly limited to, the a shaft, a flat sheet membrane element having flexibility, a suspending part for suspending the flat sheet membrane element on the shaft, a water collection nozzle for communicating a water collection flow channel with the outside of the flat sheet membrane element and a means of supplying the air from an aeration block disposed beneath the element to the element, and has such a structure that the flat sheet membrane element flutters by influences of the flows of the water to be treated and the air bubbles, in which the flat sheet membrane element has a nearly rectangular shape and at least two or more suspending parts.

The flat sheet membrane element 30 is configured by the flat sheet membrane pair in which two flat sheet membranes 20 are arranged so that the surfaces on the permeation sides thereof are opposite to each other, as exemplified in FIG. 2, and has a bag-shaped structure in which a peripheral part 22 of the flat sheet membrane pair is sealed. The flat sheet membrane element 30 has the suspending part represented by the through hole 28 at the outside end part in the surface direction of the flat sheet membrane. The through hole 28 is sealed at an edge part thereof, and configured so as to shield the inside from the outside of the flat sheet membrane element. Additionally, it may be a stricture in which a plurality of membrane elements are connected to a water collection part having a pair of water collection spaces.

In addition, the plurality of flat sheet membrane elements 30 each having the through hole 28 are arranged and put together so that the respective water collection nozzles 25 do not overlap with each other, and a shaft 34 is allowed to pass through the through holes 28 adjacent to each other to be able to obtain the element unit. In addition to appropriate rigidity, such softness as to release energy of the air supply is added to the flat sheet membrane element or the element unit by such a structure, and when submerged in an activated sludge tank to perform the filtration operation, it has excellent durability to the air supply from beneath the element unit, and so on.

Herein, in order to secure a flow channel of the water to be treated and the air, a clearance holding member 31 is provided between the flat sheet membrane elements 30 adjacent to each other. The clearance holding member 31 is not particularly limited. However, from the viewpoints of durability and impact absorbability, a washer, a collar or the like made of polyurethane or rubber such as nitrile rubber, ethylene propylene rubber, silicone rubber or fluororubber is appropriate.

In the case of the embodiment using the shaft 34, the clearance holding member 31 is preferably provided between the flat sheet membrane elements 30 adjacent to each other, and when loaded, a method of assembling the submerged type membrane separation unit by allowing the shaft 34 to pass through the through hole 28 provided in the flat sheet membrane element 30, thereafter, allowing it to pass through the clearance holding member 31, and allowing it to pass through the through hole 28 of the other flat sheet membrane element 30 adjacent thereto is appropriately exemplified.

Herein, the shape of the clearance holding member 31 is not particularly limited, and it may be either a ring shape individually divided or an integrated shape partially connected. Further, an integrated member acting as both the eyelet member for reinforcing the through hole and the clearance holding member may be used.

The thickness of the clearance holding member 31 is appropriately adjusted so that the air bubbles due to the air supply pass through a spacing provided between the flat sheet membrane elements 30 adjacent to each other. Although not particularly limited, the thickness appropriately exemplified is from 2 mm to 20 mm, and more preferably from 5 mm to 10 mm.

In addition, the shaft 34 allowed to pass through the through hole 28 of the flat sheet membrane element 30 is connected and fixed to a case 32 by a shaft holding member 33. When the flat sheet membrane element 30 is removed, the shaft 34 is unfixed by releasing the fixed part of the shaft holding member 33, and the flat sheet membrane element 30 is slid, whereby it becomes possible to draw out the element.

A method for connecting and fixing the shaft 34 and the case 32 is not limited thereto. For example, a hole through which the shaft is allowed to pass is made in a frame of the case 32, and a C-shaped or E-shaped retaining ring, spring or the like may be used.

As to materials of the shaft 34, the case 32 and the shaft holding member 33, materials having such rigidity that the structure of the submerged type membrane separation unit can be maintained when the flat sheet membrane element 30 flutters by influences of the flows of the water to be treated and the air bubbles are selected. Various metals such as stainless steel and aluminum, various thermoplastic resins such as PVC and ABS or various thermosetting resins such as polyurethane and epoxy resins can be arbitrarily selected. However, stainless steel is appropriately used in terms of corrosion resistance and rigidity.

The shape of the shaft 34 is not limited to a circular shape, and may be elliptic or nearly rectangular. Further, an integrated member may be used in which a fitting-shaped connecting member connectable to the foregoing member acting as both the eyelet member for reinforcing the through hole and the clearance holding member is provided, thereby also having a shaft function.

Filtrates (permeates) collected from the respective flat sheet membrane elements 30 are collected in the water collection pipe 27 through the water collection nozzles 25.

The size, shape and material of the water collection nozzle 25 are not particularly limited, and they may be determined in accordance with the structure of the flat sheet membrane element 30 and a spacing with the flat sheet membrane element 30 adjacent thereto. Further, the shaft 34 is made hollow and connected to the water collection nozzle 25, whereby a water collection pipe function may also be given to the shaft.

By forming such a structure, not only the appropriate rigidity having excellent durability to the air supply and so on, but also such softness as to release the energy of the air supply is added, and the structure making membrane adhered matter easily peelable by fluttering of the flat sheet membrane element 30 itself is obtained. Furthermore, even when it becomes necessary to replace a part of the flat sheet membrane elements 30 during operation, it becomes easy to partially performing disassembling and replacement without disassembling the whole.

The submerged type membrane separation unit in which the plurality of flat sheet membrane elements 30 according to the present invention are loaded has an upper part, a lower part and sides. The sides as used herein mean two faces parallel to a direction in which the plurality of flat sheet membrane elements 30 are loaded. In addition, an opening part as used herein means a flow channel for allowing the sludge or the air bubbles discharged from the spacing between the sides parallel to the direction in which the plurality of flat sheet membrane elements 30 are loaded to pass through from a space in the submerged type membrane separation unit surrounded by the case 32 into the activated sludge tank outside the submerged type membrane separation unit.

In the present invention, when the opening parts are also provided on the sides parallel to the direction in which the plurality of flat sheet membrane elements 30 are loaded, the sludge peeled from the membrane surface is easily discharged, not only from one direction of the upper part of the submerged type membrane separation unit, but also from many directions such as the sides of the submerged type membrane separation unit. This is therefore appropriate.

In the present invention, when the plurality of submerged type membrane separation units each having the opening parts on the sides parallel to the direction in which the plurality of flat sheet membrane elements 30 are loaded are submerged in the activated sludge tank, they may be arranged side by side or stacked in a plurality of stages. When arranged side by side, the plurality of units may be arranged so that the sides parallel to the direction in which the plurality of flat sheet membrane elements of the submerged type membrane separation unit are loaded are adjacent to each other, and may be arranged so that sides vertical to the direction in which the plurality of flat sheet membrane elements 30 of the submerged type membrane separation unit are loaded are adjacent to each other.

When the submerged type membrane separation unit is installed in the activated sludge tank, it is appropriate to provide a spacing between an inner wall of the activated sludge tank and the submerged type membrane separation unit, and when the plurality of submerged type membrane separation units are arranged side by side, it is appropriate to provide a spacing between the submerged type membrane separation units adjacent to each other, in securing a flow channel of the sludge discharged from the inside of the unit. The spacing between the submerged type membrane separation units adjacent to each other is not particularly limited, but it is preferably from 400 mm to 800 mm, and more preferably from 450 mm to 700 mm.

When the plurality of submerged type membrane separation units are stacked, a spacing between upper and lower flat sheet membrane element groups is arbitrary. However, in that case, it is preferred to appropriately perform adjustment so that the spacing between the flat sheet membrane elements adjacent to each other forms a communicated space in the upper and lower element groups to form a flow channel through which the air bubbles due to the air supply are allowed to uniformly pass, by making uniform the thickness of the clearance holding member 31 between the flat sheet membrane elements adjacent to each other in the flat sheet membrane element group.

In the submerged type membrane separation unit in the present invention, the inner wall of the treatment tank adjacent thereto or the side of the submerged type membrane separation unit adjacent thereto has an effect of a straightening vane. However, when the straightening vane is provided for each submerged type membrane separation unit, the spacing between the side parallel to the direction in which the plurality of flat sheet membrane elements are loaded and the straightening vane is preferably from 1 mm to 200 mm, and more preferably from about 5 mm to 100 mm.

Furthermore, the area of the straightening vane may cover 100% of the side of the submerged type membrane separation unit in all directions. However, more preferably, it is appropriate to cover 100% of the face vertical to the direction in which the plurality of flat sheet membrane elements of the submerged type membrane separation unit are loaded and to cover 10 to 90% of the side parallel to the direction in which the plurality of flat sheet membrane elements are loaded to form the opening part by the remaining part.

Herein, in the present invention, when a predetermined value P2 is reached, it is preferred to form the positively compacted integral sludge layer by performing filtration in a state that the air supply amount is smaller than that during the operation for performing the filtration while performing the air supply.

Specifically, operations shown in the following (1) and (2) are performed in this order, after the operation for performing the filtration while performing the air supply.

(1) The air supply amount to the membrane separation unit is lowered, and filtration is performed until a predetermined pressure P3 is reached.

(2) The air supply to the submerged type membrane separation unit is performed in a state that the filtration flux or the filtration pressure is smaller than that during the operation for performing the filtration while performing the air supply or negative.

Thereby, the integral sludge layer positively compacted by the operation of (1) and the sludge adhered to the membrane surface is peeled off by the operation of (2), and an effect of removing the membrane adhered matter only by physical cleaning without using any chemical is obtained.

The present invention is also effectively used when it has a coagulant addition process in the activated sludge tank or upstream or downstream thereof for dehydration and concentration of the sludge or improvement in removability of soluble matter. The coagulant includes an agent called "congealing agent" or "setting agent", and may be either organic or inorganic. A polymer coagulant having ionicity such as an anionic or cationic coagulant is also appropriately used.

In particular, the cationic polymer coagulant is most effective. The coagulant is preferably added to the tank after the addition concentration thereof has been previously confirmed by a preliminary test in response to the degree of coagulation of the sludge. A method of the preliminary test is not particularly limited. However, for example, the coagulant is added at each concentration to a small amount of the sludge collected, and the concentration at which an increase in filtrate amount or a decrease in filtrate turbidity obtained for a given filtration time is stabilized is examined using a quantitative filter paper (manufactured by Advantec Toyo Kaisha, Ltd., No. 5C). Although the addition concentration is different according to the degree of coagulation of the sludge, the coagulant is added at 0.5 to 3 wt % in many cases, and particularly at 1 to 2 wt %, on the basis of the weight of dried bacterial cells.

By adding the coagulant, fine components floating in the activated sludge combine to form an aggregate (sludge flock) and become difficult to enter into pores of the membrane, whereby an effect of mitigating a rapid increase in filtration pressure difference of the membrane is obtained. On the other hand, when it once starts to adhere to the membrane surface, the sludge layer is formed to sometimes cause a sudden increase in filtration pressure difference. In such a case, the positively compacted integral sludge layer is formed by the operation of (1), and thereafter, the sludge layer is peeled off from the membrane surface by the operation of (2), whereby the effect of removing the membrane adhered matter only by physical cleaning without using any chemical is obtained.

The present invention is also appropriately used as a wastewater treatment method by the membrane bioreactor for sludge concentrating use. The sludge concentration may be from about 20,000 to 35,000 mg/L, although not limited thereto. At a high concentration, the positively compacted integral sludge layer is formed on the membrane surface for a short period of time, and the time required for reaching the filtration pressure difference P3 is shortened. This is therefore effective. In addition, it becomes possible to more selectively discard concentrated sludge by recovering fragments (dehydrated sludge) of the integral sludge layer peeled off from the membrane surface by a net, a basket or the like, when the air supply is restarted after reaching the filtration pressure difference P3. This is therefore effective.

Figure 4:
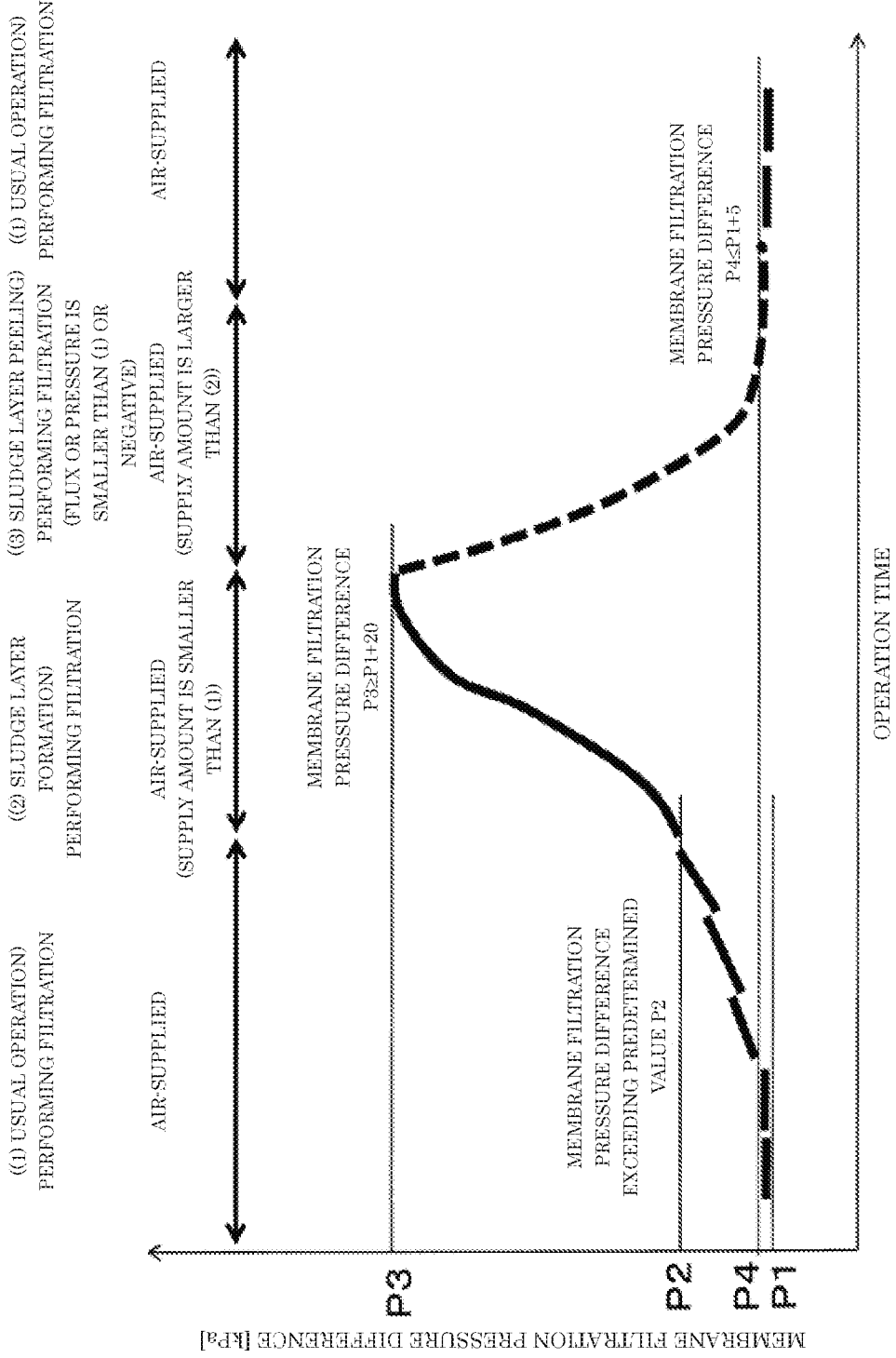
FIG. 4 shows an example of an operation control image of the present invention.

FIG. 4 shows an image for the operation control time and the filtration pressure difference. When the filtration operation is performed using the submerged type membrane separation unit in which the plurality of flat sheet membrane elements having flexibility in the present invention are loaded, it is preferred to perform filtration until the filtration pressure difference P3 satisfies P3≥P1+20 [kPa] in the state that the air supply amount is smaller than that during the operation for performing the filtration while performing the air supply, in the case where the filtration pressure difference of the flat sheet membrane elements at a filtration flow rate which is set exceeds P2 set as a predetermined value, to the filtration pressure difference P1 at an initial stage of the operation, then to perform the air supply in the state that the filtration flux or the filtration pressure is smaller than that during the operation for performing the filtration while performing the air supply or negative, and to be returned to the operation for performing the filtration while performing the air supply, after the filtration pressure difference P4 during performing filtration reaches P4≤P1+5 [kPa].

The filtration operation in the present invention is not particularly limited, and gravity by natural head difference may be used, or the operation may be performed by a suction filtration method using a suction pump.

The filtration pressure difference in the present invention means a transmembrane pressure difference (positive value) which is a difference in pressure between a primary side (feed water side) and a secondary side (filtrate side) of the filtration membrane, and during the filtration operation, it is preferred to use a pressure difference obtained by subtracting a suction pressure during operation of a filtration pump from a stop pressure at the time when the filtration pump is stopped, and a value obtained by further subtracting therefrom pressure losses of pipes and so on of the membrane filtration treatment device. However, the value obtained by subtracting the suction pressure from the stop pressure may be simply used.

The filtration pressure difference P1 at the initial stage of operation means the transmembrane pressure difference at the time when stable operation is performed in a state that the filtration operation is started at a set filtration flow rate, air bubbles in a filtrate pipe are removed and the pipe is filled with a filtrate, or the pressure difference obtained by subtracting the suction pressure from the stop pressure, and an average value of a plurality of values may be adopted. The filtration pressure difference P1 in the present invention is not particularly limited, and may be determined on the basis of a standard filtration pressure difference at an initial stage of starting of the filtration operation in the plant concerned. It is usually less than 10 kPa, and more preferably from 1 to 7 kPa.

The predetermined value P2 in the present invention is not particularly limited, and may be determined as an upper limit control value in response to P1. It is arbitrary between 10 and 25 kPa, but usually appropriately from about 15 to 20 kPa.

The operation for performing the filtration while performing the air supply in the present invention means operation for concurrently continuously performing filtration at the set filtration flow rate while continuously performing the air supply, or a combination with intermittent filtration operation in which, for example, filtration at the set filtration flow rate for 8 to 9 minutes and stopping of the filtration for 1 to 2 minutes are repeated. Herein, the air supply may be intermittently performed as long as not accompanied by an increase in filtration pressure difference.

The filtration operation in the state that the air supply amount is smaller than that during the operation for performing the filtration while performing the air supply in the present invention is performed until the filtration pressure difference reaches P3.

Herein, the state that the air supply amount is smaller than that during the operation for performing the filtration while performing the air supply means, for example, a state that the air supply amount is reduced by decreasing a discharge rate of an air pump to ½ and further 1/10 the rate during the operation, and more preferably, the air supply may be stopped by stopping the air pump. Furthermore, the supply and stop may be intermittently performed, or different discharge rates may be combined.

The filtration operation in the state that the air supply amount is small in the present invention is preferably performed until the filtration pressure difference P3 reaches a range of P3≥P1+20 [kPa]. Further, it is more preferred to perform the filtration operation so as to become within a range of P1+30≤P3≤P1+50 [kPa]. In the case of P3<P1+20 [kPa], a partially adhered state of the sludge occurs or formation of the compacted integral sludge layer becomes insufficient, and thereafter, the sludge peeling by the air supply in the state that the filtration flux or the filtration pressure is smaller than that during the operation for performing the filtration while performing the air supply or negative is liable to become insufficient. Although it may seem that the filtration pressure difference is temporarily recovered, the pressure is thereafter increased again, resulting in an increase in chemical cleaning frequency. In addition, in the case of the filtration pressure difference P3>P1+50 [kPa], the filtration time or air supply amount until reaching P4 is sometimes required to be increased.

The filtration flow rate or filtration time until reaching P3 is not particularly limited, and filtration operation conditions until reaching P2 may be continued as such, or in order to shorten the time, the filtration flow rate may be temporarily increased by about 1.1 to 2 times.

In the present invention, after the filtration operation is performed until the filtration pressure difference reaches P3, the air supply is performed in the state that the filtration flux or the filtration pressure is smaller than that during the operation for performing the filtration while performing the air supply or negative, and after it is confirmed that the filtration pressure difference P4 reaches P4≤P1+5 [kPa], operation is returned to the operation for performing the filtration while performing the air supply.

Herein, the state that the filtration flux is smaller than that during the operation for performing the filtration while performing the air supply means a state that, for example, a set flow rate value of the filtration pump is decreased to ½, further ⅕ that during the operation for performing the filtration while performing the air supply, thereby decreasing the filtration flow rate per membrane area or the air supply amount. More preferably, the filtration operation may be stopped by stopping the filtration pump. The flow rate may be changed stepwise, or different flow rates may be combined.

Further, the state that the filtration flux is negative means so-called backwashing in which a water flow from the primary side (feed water side) to the secondary side (filtrate side) of the filtration membrane are temporarily changed over, whereby the water is positively allowed to flow from the secondary side (filtrate side) of the filtration membrane to the membrane surface in the opposite direction to that during the filtration operation.

In addition, the state that the filtration pressure is smaller than that during the operation for performing the filtration while performing the air supply or negative means a state of indicating a value lower than that during the filtration operation by stopping the pump.

Herein, the pressure may be positively applied from the permeation side (secondary side) of the membrane to the membrane surface in the opposite direction to that during the filtration operation by temporarily reversing the drive of the pump.

When the air supply is performed and it is confirmed whether the filtration pressure difference P4 reaches P4≤P1+5 [kPa] or not, in the case where P4 does not reaches, the operation for performing the air supply is performed again in the state that the filtration flux or the filtration pressure is smaller than that during the operation for performing the filtration while performing the air supply or negative, and thereafter, the filtration operation is performed again. This operation is preferably repeated until P4≤P1+5 [kPa] is satisfied. Herein, the filtration pressure difference P4 is a value lower than P2 set as the predetermined value, and it is appropriate to be decreased to P1+5 [kPa] or less, preferably P1+3 [kPa] or less, and more preferably P1+1 [kPa] or less.

In the present invention, the air supply amount (air strength) when the air supply is performed after the filtration operation is performed until the filtration pressure difference reaches P3 is not particularly limited, and may be any as long as physical adverse effects (breakage and so on) are not exerted on the flat sheet membrane element or the submerged type membrane separation unit. However, the air supply amount is preferably set higher than the preceding air supply amount until reaching P3, and may be set to a level equal to or higher than that during the usual filtration operation. Although depending on the number of elements, for example, in the case of a submerged type membrane separation unit in which 50 flat sheet membrane elements of 500 mm wide×1000 mm high are installed at 7.5-mm intervals, the air supply amount during the usual filtration operation is preferably set within a range of 250 to 800 NL/min/module, and more preferably within a range of 300 to 450 NL/min/module.

In addition, the time for which the filtration is stopped and only the air supply is performed is not particularly limited, and the air supply is performed for a time required for reaching P3. The air flow rate may be temporarily set high, and the air flow rate and the supply time may each be set stepwise. The air supply time is not particularly limited. However, considering that no filtrate is obtained during that time and the presence/absence of an influence on biological treatment by the activated sludge, the air supply is performed preferably within 48 hours, and more preferably within 30 minutes to 24 hours.

The plurality of submerged type membrane separation units are provided in a membrane bioreactor tank, and the operation of the present invention is performed with time shifted little by little concurrently while continuing the operation, whereby the operation may be performed without decreasing the treated water amount as the whole tank.

The size of the air bubbles during the air supply is not particularly limited, and may be from fine to coarse, or a mixture thereof. In the submerged type membrane separation unit, it is preferred to achieve such an air diffusion pipe configuration that the air bubbles are allowed to pass through the spacing between the membrane elements and come into contact with each membrane element without deviation.

A series of operation control when the foregoing filtration pressure difference of the flat sheet membrane element exceeds P2 may be performed manually or by automatic control. In addition, this may be repeated a plurality of times.

When the backwashing (water such as membrane-treated water is injected from the permeation side (secondary side) of the membrane) is performed, water with which chemical liquids previously known to have no adverse influence on the microorganisms in the activated sludge are mixed under various conditions (the type, concentration and amount used) may be used. However, before performing cleaning using the chemical liquid, the series of operations of the present invention are previously performed without using any chemical liquid, whereby it becomes possible to substantially reduce the amount used of the chemical liquid.

The present invention is for minimizing the frequency of chemical liquid cleaning exerting the adverse influences on the microorganisms in the activated sludge to realize long-term stable operation, and is not particularly limited.

EXAMPLES

The present invention will be illustrated below with reference to examples and comparative examples, but the present invention should not be construed as being limited by these examples in any way.

Example 1

In an agriculture community sewage/wastewater treatment facility, one submerged type membrane separation unit (FIG. 3) in which 50 flat sheet membrane elements (500 mm wide×1000 mm high, thickness: 3 mm, effective membrane area: 1 $m^2$, made of polyvinylidene fluoride) having flexibility shown in FIG. 2 were set so that the flat sheet membrane elements adjacent to each other were spaced at 7.5-mm intervals with clearance holding members made of ethylene propylene rubber, each having a thickness of 7.5 mm, was placed in a tank of a membrane bioreactor device (width: 1.5 m, depth: 1 m, height: 3 m, tank volume: 4.5 $m^3$) shown in FIG. 1. An air diffuser 8 for supplying the air was installed beneath the submerged type membrane separation unit, and to the air diffuser 8, the air was supplied at 330 NL/min/module by an air supply device 7. Using an apparatus thus constructed and agriculture community sewage/wastewater as water to be treated, filtration operation was performed while supplying the air for about 3 months. The filtration flux was set to 0.8 $m^3/m^2/d$ on the basis of the results of a preliminary test for sludge previously collected.

The filtration pressure difference P1 at an initial stage of operation was 5 kPa. After the operation for performing filtration while performing the air supply was continued for 3 months, the filtration pressure difference reached 15 kPa set as a predetermined value P2. Therefore, cleaning was performed in the tank under the conditions of the present invention.

The air supply was reduced to 33 NL/min/module (0.1 times amount), and filtration was performed at a filtration flux of 0.8 $m^3/m^2/d$ until the filtration pressure difference P3 reached 30 kPa, whereby a sludge layer was positively formed. Thereafter, the filtration flux was reduced to 0.1 $m^3/m^2/d$, and the air supply was performed at 330 NL/min/module for 2 hours, whereby the sludge layer was peeled off all at once. When the usual filtration operation was restarted after the cleaning, the filtration pressure difference P4 was recovered to 5 kPa, which was approximately equal to the filtration pressure difference P1 at the initial stage of operation. The filtrate turbidity at this time was as good as 0.2 NTU, and foaming was not observed in the sludge after restarting the operation.

Comparative Example 1

In the same agriculture community sewage/wastewater treatment facility as in Example 1, one membrane bioreactor device (the device configuration was the same as in Example 1) in a tank of which a submerged type membrane separation unit other than that in Example 1 was installed was placed, and the filtration operation was started concurrently with Example 1 under the same filtration conditions (filtration flux: 0.8 $m^3/m^2/d$, air supply amount: 330 NL/min/module).

The filtration pressure difference P1 at the initial stage of operation was 5 kPa. After the operation for performing filtration while performing the air supply was continued for 3 months, the filtration pressure difference reached 15 kPa set as a predetermined value P2. Therefore, cleaning using a chemical was performed herein.

The air supply and the filtration were stopped, and chemical cleaning was performed by injecting a 5000 mg/L solution of sodium hypochlorite into the membranes from the secondary side thereof while submerging the submerged type membrane separation unit in the activated sludge and allowing it to stand still for 2 hours. When the usual filtration operation was restarted after the cleaning, the filtration pressure difference P4 was recovered to 5 kPa, which was approximately equal to the filtration pressure difference P1 at the initial stage of operation. However, the filtrate turbidity was as poor as 1.7 NTU, and foaming was observed in the sludge after restarting the operation. It was considered that adverse influences were exerted on the sludge around the membranes by the chemical cleaning. In addition, about 6 hours were required for decreasing the turbidity of the filtrate to the level before the cleaning, and a waiting time was required until quality of treated water immediately after the chemical cleaning became suitable for use.

Example 2

In a polymer resin production process wastewater treatment plant, one submerged type membrane separation unit (FIG. 3) in which 50 membrane elements (500 mm wide× 1000 mm high, thickness: 3 mm, effective membrane area: 1 $m^2$, made of polyvinylidene fluoride) having flexibility were set so that the flat sheet membrane elements adjacent to each other were spaced at 7.5-mm intervals with clearance holding members made of ethylene propylene rubber, each having a thickness of 7.5 mm, was placed in a tank of a membrane bioreactor device (width: 1.5 m, depth: 1 m, height: 3 m, tank volume: 4.5 $m^3$) shown in FIG. 1. An air diffuser 8 for supplying the air was installed beneath the submerged type membrane separation unit, and to the air diffuser 8, the air was supplied at 350 NL/min/module by an air supply device 7. Using an apparatus thus constructed and polymer resin production process wastewater as water to be treated, filtration operation was performed while supplying the air for about 3 months. The filtration flux was set to 0.5 $m^3/m^2/d$ on the basis of the results of a preliminary test for sludge previously collected.

The filtration pressure difference P1 at the initial stage of operation was 5 kPa. After the operation for performing the filtration while performing the air supply was continued for 3 months, the filtration pressure difference reached 15 kPa set as a predetermined value P2. Therefore, cleaning was performed in the tank.

For the cleaning, filtration was performed by stopping the air supply and increasing the filtration flux to 0.8 m³/m²/d until the filtration pressure difference P3 reached 38 kPa, whereby a sludge layer was positively formed, thereafter the filtration flux was decreased to 0.1 m³/m²/d, and the air supply was performed at 350 NL/min/module. After 2 hours, sludge blocks considered to come out from opening parts floated at an upper part of the membrane unit, and thereafter, there was a tendency that the filtration pressure difference P4 during performing filtration was recovered to 5 kPa.

Comparative Example 2

In the same polymer resin production process wastewater treatment plant as in Example 2, one membrane bioreactor device (the device configuration was the same as in Example 2) in a tank of which a submerged type membrane separation unit other than that in Example 2 was installed was placed, and the filtration operation was started concurrently with Example 2 under the same filtration conditions (filtration flux: 0.5 m³/m²/d, air supply amount: 350 NL/min/module).

The filtration pressure difference P1 at the initial stage of operation was 5 kPa. After the operation for performing the filtration while performing the air supply was continued for 3 months, the filtration pressure difference reached 15 kPa set as a predetermined value P2. Therefore, cleaning was performed in the tank.

For cleaning conditions, filtration was performed by stopping the air supply to increase the filtration flux to 0.8 m³/m²/d until the filtration pressure difference P3 reached 38 kPa, whereby a sludge layer was positively formed.

Thereafter, the air supply was performed in a state that the filtration flux was decreased to 0.6 m³/m²/d for 2 hours, and then, the filtration pressure difference P4 was confirmed. As a result, it was further increased to 45 kPa.

From this, it was revealed that the air supply was preferably performed in a state that the filtration flux after the air supply was stopped and the filtration was performed to positively form the sludge layer was smaller than that during the operation for performing filtration while performing the air supply, between P1 and P2.

Example 3

In the same polymer resin production process wastewater treatment plant as in Example 2, filtration operation was started using one membrane bioreactor device (the device configuration was the same as in Example 2) in a tank of which a submerged type membrane separation unit was installed, during the time (when the water temperature was low in winter) different from the time (when the water temperature was high in summer) in Example 2. Herein, in order to improve filterability of sludge, a cationic polymer coagulant was added on the basis of conditions determined by a preliminary test, and operation was performed under the same filtration conditions (filtration flux: 0.5 m³/m²/d, air supply amount: 350 NL/min/module) as in Example 2.

The filtration pressure difference P1 at the initial stage of operation was 5 kPa. After the operation for performing the filtration while performing the air supply was continued for 3 months, the filtration pressure difference reached 15 kPa set as a predetermined value P2. Therefore, cleaning was performed in the tank.

For cleaning conditions, filtration was performed by stopping the air supply to increase the filtration flux to 0.8 m³/m²/d until the filtration pressure difference P3 reached 38 kPa, whereby a sludge layer was positively formed.

Thereafter, the air supply was performed in a state that the filtration flux was decreased to 0.1 m³/m²/d for 1 hour, and then, sludge blocks considered to come out from opening parts floated at an upper part of the membrane unit. Thereafter, there was a tendency that the filtration pressure difference P4 during performing filtration was recovered to 5 kPa.

From this, it was revealed that, for the case of the sludge to which the coagulant was added, there was an effect of shortening the air supply time when the air supply was performed in the state that the filtration flux after the air supply was stopped and the filtration was performed to positively form the sludge layer was smaller than that during the operation for performing the filtration while performing the air supply, compared with the case of the sludge to which no coagulant was added.

Example 4

In a fiber production process wastewater treatment plant, one submerged type membrane separation unit (FIG. 3) in which 50 membrane elements (500 mm wide×1000 mm high, thickness: 3 mm, effective membrane area: 1 m², made of polyvinylidene fluoride) having flexibility were set so that the flat sheet membrane elements adjacent to each other were spaced at 7.5-mm intervals with clearance holding members made of ethylene propylene rubber, each having a thickness of 7.5 mm, was placed in a tank of a membrane bioreactor device (width: 1.5 m, depth: 1 m, height: 3 m, tank volume: 4.5 m³) shown in FIG. 1. An air diffuser 8 for supplying the air was installed beneath the submerged type membrane separation unit, and to the air diffuser 8, the air was supplied at 380 NL/min/module by an air supply device 7. Using an apparatus thus constructed and fiber production process wastewater as water to be treated, filtration operation was performed while supplying the air for about 3 months. The filtration flux was set to 0.6 m³/m²/d on the basis of the results of a preliminary test for sludge previously collected.

In also this case, the filtration pressure difference P1 at the initial stage of operation was 5 kPa. After the operation for performing the filtration while performing the air supply was continued for 3 months, the filtration pressure difference reached 20 kPa set as a predetermined value P2. Therefore, cleaning was performed in the tank.

For the cleaning, the air supply was reduced to 38 NL/min/module (0.1 times amount), and filtration operation was continued at a filtration flux of 0.5 m³/m²/d. After a sludge layer was positively formed until the filtration pressure difference P3 reached 35 kPa, the filtration was stopped, and the air supply was performed at 380 NL/min/module for 2 hours, whereby the sludge layer was peeled off all at once. When the usual filtration operation was restarted after the cleaning, the filtration pressure difference P4 was recovered to 5 kPa, which was approximately equal to the filtration pressure difference P1 at the initial stage of operation.

Comparative Example 3

In the same fiber production process wastewater treatment plant as in Example 4, one membrane bioreactor device (the device configuration was the same as in Example 4) in a tank of which a submerged type membrane separation unit other than that in Example 4 was installed was placed, and the filtration operation was started concurrently with Example 4 under the same filtration conditions (filtration flux: 0.6 m³/m²/d, air supply amount: 380 NL/min/module).

The filtration pressure difference P1 at the initial stage of operation was 5 kPa. After the operation for performing the filtration while performing the air supply was continued for 3 months, the filtration pressure difference reached 20 kPa set as a predetermined value P2. Therefore, cleaning was performed in the tank.

For the cleaning, the filtration flux was increased to 0.8 m³/m²/d in a state that the air supply was continued at 380 NL/min/module, a sludge layer was positively formed until the filtration pressure difference P3 reached 35 kPa, thereafter the filtration was stopped, and the air supply was performed at 380 NL/min/module for 2 hours. When the usual filtration operation was restarted after the cleaning, the filtration pressure difference P4 was recovered only to 12 kPa. When the operation for performing the filtration while performing the air supply was restarted as such, there was a tendency that the filtration pressure difference was further increased.

From this, it was revealed that the cleaning was required to be performed by performing the foregoing air supply, after the sludge layer was positively formed until the filtration pressure difference P3 was attained, in the state that the filtration flux or the filtration pressure was smaller than that during the operation for performing the filtration while performing the foregoing air supply or negative, until the filtration pressure difference P4 during performing filtration fulfilled P4≤P1+5 [kPa].

Example 5

In a fiber production process wastewater treatment plant other than that in Example 4, one submerged type membrane separation unit (FIG. 3) in which 50 membrane elements (500 mm wide×1000 mm high, thickness: 3 mm, effective membrane area: 1 m², made of polyvinylidene fluoride) having flexibility were set so that the flat sheet membrane elements adjacent to each other were spaced at 7.5-mm intervals with clearance holding members made of ethylene propylene rubber, each having a thickness of 7.5 mm, was placed in a tank of a membrane bioreactor device (width: 1.5 m, depth: 1 m, height: 3 m, tank volume: 4.5 m³) shown in FIG. 1. An air diffuser 8 for supplying the air was installed beneath the submerged type membrane separation unit, and to the air diffuser 8, the air was supplied at 360 NL/min/module by an air supply device 7. Using an apparatus thus constructed and fiber production process wastewater as water to be treated, filtration operation was performed while supplying the air for about 3 months. The filtration flux was set to 0.6 m³/m²/d on the basis of the results of a preliminary test for sludge previously collected.

In also this case, the filtration pressure difference P1 at the initial stage of operation was 5 kPa. After the operation for performing the filtration while performing the air supply was continued for 3 months, the filtration pressure difference reached 20 kPa set as a predetermined value P2. Therefore, cleaning was performed in the tank.

For the cleaning, the air supply was stopped, filtration was performed at a filtration flux of 0.6 m³/m²/d until the filtration pressure difference P3 reached 35 kPa, whereby a sludge layer was positively formed, and thereafter, the air supply was performed at 360 NL/min/module in a state that back pressure was applied from a permeation side of the membranes by decreasing a set value of a filtration flow rate and further switching the driving of a filtration pump. After 1 hour, it was confirmed that the filtration pressure difference P4 was recovered to 5 kPa. Thereafter, the operation for performing the filtration while performing the air supply was restarted by returning the driving of the filtration pump and the set value of the filtration flow rate to the state before the cleaning. As a result, a short-term increase in filtration pressure difference was not observed, and the operation was possible at less than P2 (20 kPa) as the predetermined value for 3 months.

Comparative Example 4

In the same fiber production process wastewater treatment plant as in Example 5, one membrane bioreactor device (the device configuration was the same as in Example 5) in a tank of which a submerged type membrane separation unit other than that in Example 5 was installed was placed, and the filtration operation was started concurrently with Example 5 under the same filtration conditions (filtration flux: 0.6 m³/m²/d, air supply amount: 360 NL/min/module).

The filtration pressure difference P1 at the initial stage of operation was 5 kPa. After the operation for performing the filtration while performing the air supply was continued for 3 months, the filtration pressure difference reached 20 kPa set as a predetermined value P2. Therefore, cleaning was performed in the tank.

For the cleaning herein, the air supply amount was set as high as 460 NL/min/module (1.2 times amount), and filtration was performed at a filtration flux of 0.6 m³/m²/d. Even after an elapse of 2 hours, the filtration pressure difference P3 was kept at 20 kPa, and did not reach P3≥P1+20 [kPa] as the range of P3 in the present invention. However, the filtration was stopped here, and the air supply was performed for 2 hours while setting the air supply amount as high as 460 NL/min/module (1.2 times amount). When the filtration pressure difference P4 after 2 hours was confirmed, it was 20 kPa and not recovered.

From this, it was revealed that it was important to stop the air supply and perform filtration during the cleaning, whereby the sludge layer was positively formed so as to be within the range of the filtration pressure difference P3.

Evaluating conditions and determination results of the present invention are shown in Table 1.

TABLE 1

|  | Wastewater Species | Membrane Bioreactor Device No. | P1 (kPa) | Operation Conditions between P1 And P2 | P2 (kPa) | Operation Conditions between P2 and P3 | P3 (kPa) | Operation Conditions between P3 and P4 | P4 (kPa) | Determination Results after Cleaning |
|---|---|---|---|---|---|---|---|---|---|---|
| Example 1 | Agriculture community sewage/wastewater | No. 1 | 5 | Filtrated (Flux0.8 m³/m²/d) Air-supplied | 15 | Filtrated (Flux0.8 m³/m²/d) Air-supplied (0.1 times | 30 | Filtrated (Flux0.1 m³/m²/d) Air-supplied (2 hours) | 5 | ○ (Filtrate quality was also good) |

TABLE 1-continued

|  | Wastewater Species | Membrane Bioreactor Device No. | P1 (kPa) | Operation Conditions between P1 And P2 | P2 (kPa) | Operation Conditions between P2 and P3 | P3 (kPa) | Operation Conditions between P3 and P4 | P4 (kPa) | Determination Results after Cleaning |
|---|---|---|---|---|---|---|---|---|---|---|
| Comparative Example 1 | Agriculture community sewage/wastewater | No. 2 | 5 | Filtrated (Flux0.8 $m^3/m^2/d$) Air-supplied | 15 | Only chemical cleaning for 2 hours |  |  | 5 | x (Filtrate quality was temporarily deteriorated) |
| Example 2 | Polymer resin production process wastewater | No. 3 | 5 | Filtrated (Flux0.5 $m^3/m^2/d$) Air-supplied | 15 | Filtrated (Flux0.8 $m^3/m^2/d$) Air supply was stopped | 38 | Filtrated (Flux0.1 $m^3/m^2/d$) Air-supplied (2 hours) | 5 | ○ (Operable for the same period as before cleaning) |
| Comparative Example 2 | Polymer resin production process wastewater | No. 4 | 5 | Filtrated (Flux0.5 $m^3/m^2/d$) Air-supplied | 15 | Filtrated (Flux0.8 $m^3/m^2/d$) Air supply was stopped | 38 | Filtrated (Flux0.6 $m^3/m^2/d$) Air-supplied (2 hours) | 45 | x (Filtration pressure difference was increased again due to insufficient cleaning) |
| Example 3 | Polymer resin production process wastewater (addition of cationic polymer coagulant) | No. 3 | 5 | Filtrated (Flux0.5 $m^3/m^2/d$) Air-supplied | 15 | Filtrated (Flux0.8 $m^3/m^2/d$) Air supply was stopped | 38 | Filtrated (Flux0.1 $m^3/m^2/d$) Air-supplied (1 hour) | 5 | ○ (Recovered for a shorter time than before addition of coagulant) |
| Example 4 | Fiber production process wastewater | No. 5 | 5 | Filtrated (Flux0.6 $m^3/m^2/d$) Air-supplied | 20 | Filtrated (Flux0.5 $m^3/m^2/d$) Air-supplied (0.1 times amt.) | 35 | Filtration was stopped Air-supplied (2 hours) | 5 | ○ (Operable for the same period as before cleaning) |
| Comparative Example 3 | Fiber production process wastewater | No. 6 | 5 | Filtrated (Flux0.6 $m^3/m^2/d$) Air-supplied | 20 | Filtrated (Flux0.8 $m3/m^2/d$) Air-supplied (1 time amt.) | 35 | Filtration was stopped Air-supplied (2 hours) | 12 | x (Filtration pressure difference was increased again due to insufficient cleaning) |
| Example 5 | Fiber production process wastewater | No. 7 | 5 | Filtrated (Flux0.6 $m^3/m^2/d$) Air-supplied | 20 | Filtrated (Flux0.6 $m3/m^2/d$) Air supply was stopped | 35 | Back pressure Air-supplied (1 hour) | 5 | ○ (Operable for the same period as before cleaning) |
| Comparative Example 4 | Fiber production process wastewater | No. 8 | 5 | Filtrated (Flux0.6 $m^3/m^2/d$) Air-supplied | 20 | Filtrated (Flux0.6 $m3/m^2/d$) Air-supplied (1.2 times amt.) | 20 | Filtration was stopped Air-supplied (1.2 times amt.)(2 hours) | 20 | x (Not recovered due to insufficient cleaning) |

While the present invention has been described above in detail and with reference to specific embodiments thereof, it will be apparent to one skilled in the art that various changes and modifications can be made thereto without departing from the spirit and scope of the present invention. This application is based on Japanese Patent Application No. 2016-090450 filed on Apr. 28, 2016, the contents of which are incorporated herein by reference.

DESCRIPTION OF REFERENCE NUMERALS AND SIGNS

1: Organic wastewater (raw water)
2: Submerged type membrane separation unit
3: Activated sludge treatment tank
4: Filtrate tank
5: Treated water
6: Raw-water feed pump
7: Air supply device
8: Air diffuser
9: Suction pump
10: Sludge drawing pump
11: Drawn-out sludge (excess sludge)
20: Flat sheet membrane
21: Water collection flow channel
22: Sealing part
23: Resin part (adhesive interlining cloth)
24: Water collection port
25: Water collection nozzle
26: Connection port
27: Water collection pipe
28: Through hole
30: Flat sheet membrane element
31: Clearance holding member
32: Case
33: Shaft holding member
34: Shaft

The invention claimed is:

1. A wastewater treatment method by a membrane bioreactor, comprising, during operation for performing filtration while performing air supply using a submerged type membrane separation unit in which a plurality of membrane elements having flexibility are loaded, when a filtration pressure difference of the membrane elements exceeds a predetermined value P2, to a filtration pressure difference P1 at an initial stage of the operation, performing filtration until a filtration pressure difference P3 satisfies P3≥P1+20 [kPa] in a state that an air supply amount is smaller than that during the operation for performing the filtration while performing the air supply, then performing the air supply in a state that a filtration flux or a filtration pressure is smaller than that during the operation for performing the filtration while performing the air supply or negative, and being returned to the operation for performing the filtration while performing the air supply after a filtration pressure difference P4 during performing the filtration reaches P4≤P1+5 [kPa].

2. The wastewater treatment method according to claim 1, wherein, when the filtration pressure difference of the membrane elements exceeds the predetermined value P2, to the filtration pressure difference P1 at the initial stage of the operation, the filtration is performed until the filtration pressure difference P3 satisfies P3≥P1+20 [kPa] in a state that the air supply is stopped.

3. The wastewater treatment method according to claim 1, wherein the filtration is performed until the filtration pressure difference P3 satisfies P3≥P1+20 [kPa], and thereafter, the air supply is performed in a state that the filtration is stopped.

4. The wastewater treatment method according to claim 1, wherein the filtration is performed until the filtration pressure difference P3 satisfies P3≥P1+20 [kPa], and thereafter, the air supply amount is more increased than the last supply amount.

5. The wastewater treatment method according to claim 1, wherein the filtration is performed until the filtration pressure difference P3 satisfies P1+30≤P3≤P1+50 [kPa].

6. The wastewater treatment method according to claim 1, wherein, during the operation for performing the filtration while performing the air supply, when the filtration pressure difference of the membrane elements exceeds the predetermined value P2, to the filtration pressure difference P1 at the initial stage of the operation, a time period for performing the filtration until the filtration pressure difference P3 satisfies P3≥P1+20 [kPa] in the state that the air supply amount is smaller than that during the operation for performing the filtration while performing the air supply is from 30 minutes to 48 hours.

7. The wastewater treatment method according to claim 1, wherein the membrane bioreactor comprises a coagulant addition process.

8. The wastewater treatment method according to claim 1, wherein, as the submerged type membrane separation unit, a submerged type membrane separation unit having an opening part on a side thereof which is parallel to a direction in which the plurality of membrane elements are loaded is used.

9. The wastewater treatment method according to claim 1, wherein the membrane elements loaded in the submerged type membrane separation unit are flat sheet membrane elements.

10. The wastewater treatment method according to claim 9, wherein the flat sheet membrane elements each comprise: a flat sheet membrane pair having two flat sheet membranes arranged so that surfaces on permeation sides thereof are opposite to each other and a water collection flow channel provided between the flat sheet membranes; a sealing part for sealing between the flat sheet membranes in a peripheral part thereof; and an adhesive interlining cloth having a resin part for bonding both surfaces on the permeation sides of the flat sheet membrane pair which are opposite to each other, whereby a predetermined spacing is ensured between the flat sheet membranes.

* * * * *